US009501821B2

United States Patent
Pfitzner et al.

(10) Patent No.: US 9,501,821 B2
(45) Date of Patent: Nov. 22, 2016

(54) METHOD FOR DETECTING DEFECTS DURING A LASER-MACHINING PROCESS AND LASER-MACHINING DEVICE

(71) Applicant: TRUMPF Laser—und Systemtechnik GmbH, Ditzingen (DE)

(72) Inventors: Dieter Pfitzner, Althengstett (DE); Holger Braun, Renningen (DE); Friedhelm Dorsch, Stuttgart (DE)

(73) Assignee: TRUMPF Laser-und Systemtechnik GmbH, Ditzingen (DE)

( * ) Notice: Subject to any disclaimer, the term of this patent is extended or adjusted under 35 U.S.C. 154(b) by 269 days.

(21) Appl. No.: 14/140,711

(22) Filed: Dec. 26, 2013

(65) Prior Publication Data

US 2014/0175071 A1 Jun. 26, 2014

Related U.S. Application Data (63) Continuation of application No. PCT/EP2012/059158, filed on May 16, 2012.

(30) Foreign Application Priority Data

Jun. 29, 2011 (DE) .................. 10 2011 078 276

(51) Int. Cl.
*B23K 26/02* (2014.01)
*G06T 7/00* (2006.01)
(Continued)

(52) U.S. Cl.
CPC ........... *G06T 7/0008* (2013.01); *B23K 26/032* (2013.01); *B23K 26/034* (2013.01);
(Continued)

(58) Field of Classification Search
CPC .......... B23K 2201/34; B23K 2203/50; B23K 26/032; B23K 26/02–26/0342; B23K 26/04; B23K 26/24; B23K 26/30; B23K 26/244; B23K 26/32; B23K 26/322; G06T 7/0008
USPC ......................................... 219/121.6–121.83
See application file for complete search history.

(56) References Cited

U.S. PATENT DOCUMENTS

| 3,648,009 A | 3/1972 | Steigerwald |
| 4,918,284 A * | 4/1990 | Weisz .................. B23K 26/042 |
| | | 219/121.69 |

(Continued)

FOREIGN PATENT DOCUMENTS

| CN | 101028671 A | 9/2007 |
| CN | 101267910 A | 9/2008 |

(Continued)

OTHER PUBLICATIONS

Bardin et al., "Optical techniques for real-time penetration monitoring for laser welding", Applied Optics, vol. 44, No. 19, pp. 3869-3876, 2005.

(Continued)

*Primary Examiner* — Sang Y Paik
(74) *Attorney, Agent, or Firm* — Fish & Richardson P.C.

(57) ABSTRACT

Detection of defects during a machining process includes: moving a laser beam along a predefined path over multiple workpieces to be machined so as to generate a weld seam or a cutting gap in the workpieces; detecting, in a two-dimensional spatially resolved detector field of a detector, radiation emitted and/or reflected by the multiple workpieces; selecting at least one detection field section in the detection field of the detector based on laser beam control data defining movement of the laser beam along the predefined path or based on a previously determined actual-position data of the laser beam along the predefined path, wherein each detection field section comprises a region encompassing less than the entire detection field; evaluating the radiation detected in the selected detection field section; and determining whether a defect exists at the weld seam or the cutting gap based on the evaluated radiation.

14 Claims, 4 Drawing Sheets

(51) Int. Cl.
   *B23K 26/03*   (2006.01)
   *B23K 26/04*   (2014.01)
   *B23K 26/32*   (2014.01)
(52) U.S. Cl.
   CPC ............ *B23K 26/04* (2013.01); *B23K 26/244* (2015.10); *B23K 26/32* (2013.01); *B23K 26/322* (2013.01); *B23K 2201/34* (2013.01); *B23K 2203/50* (2015.10)

(56) References Cited

U.S. PATENT DOCUMENTS

| | | | | |
|---|---|---|---|---|
| 4,950,862 | A * | 8/1990 | Kajikawa | B23K 26/04 219/121.68 |
| 5,506,386 | A * | 4/1996 | Gross | B23K 26/034 219/121.63 |
| 2006/0011592 | A1 * | 1/2006 | Wang | B23K 26/032 219/121.64 |
| 2006/0191622 | A1 | 8/2006 | Ritter | |
| 2009/0245637 | A1 | 10/2009 | Barman | |
| 2010/0086003 | A1 * | 4/2010 | Pfitzner | B23K 26/032 374/5 |

FOREIGN PATENT DOCUMENTS

| | | | |
|---|---|---|---|
| DE | 10335501 | A1 | 2/2004 |
| DE | 102007024510 | B3 | 9/2008 |
| DE | 102007025463 | A1 | 3/2009 |
| DE | 102008062866 | A1 | 5/2010 |
| DE | 102009050784 | A1 | 5/2011 |
| DK | 1371443 | T3 | 5/2006 |
| EP | 1099506 | A1 | 5/2001 |
| ES | 2345947 | T3 | 10/2010 |
| FR | 2047386 | | 12/1971 |
| WO | 0029166 | A1 | 5/2000 |
| WO | 2008145237 | A1 | 12/2008 |

OTHER PUBLICATIONS

Beersiek, Joerg, "A CMOS camera as a tool for process analysis not only for laser beam welding", Published at ICALEO '01, 4 pages, 2001.
Beersiek, Joerg, "New aspects of Monitoring with a CMOS camera for Laser Materials Processing", Published at ICALEO '02, 8 pages, 2002.
Mandel et al., "On-line Control and quality improvement of laser-beam welding by High-dynamic CMOS cameras—a major step in manufacturing quality", Publised in Lane 2004, 16 pages, 2004.
Prozessuberwachungssystem Welding Monitor PD 2000, 10 pages, 2006.
Stache et al., "Automatic Compensation of Workpiece Positioning Tolerances for Precise Laser Welding", Acta Polytechnica, vol. 48, No. 3, 6 pages, 2008.
International Search Report from corresponding PCT Application No. PCT/EP2012/059158, mailed Sep. 28, 2012, 4 pages.
Notification of Transmittal of the International Preliminary Report on Patentability and Written Opinion for corresponding PCT Application No. PCT/EP2012/059158, mailed Jan. 16, 2014, 9 pages.

* cited by examiner

METHOD FOR DETECTING DEFECTS DURING A LASER-MACHINING PROCESS AND LASER-MACHINING DEVICE

TECHNICAL FIELD

The present disclosure relates to laser-machining devices and methods for detecting defects during a laser-machining process.

BACKGROUND

Process-monitoring devices are used to detect defects during the laser-machining of workpieces. For example, when laser-welding workpieces, fusion defects may occur in the weld seam in which a flush connection is not made in certain areas between the workpieces welded to one another. Since, in the event of such fusion defects, the weld seam appears to be free of defects when viewed from the outside, indirect assessment parameters usually have to be used to detect these weld seam defects clearly.

WO 2008/145237 A1 discloses, in this respect, a method in which a detector oriented coaxially to the laser beam is used to detect, in a two-dimensionally spatially resolved manner, radiation emitted by the workpiece in the detection field of the sensor. The weld seam defects are detected by evaluating the previously detected radiation in the area of a solidified melt adjoining a liquid weld pool and/or in the area of the liquid weld pool of the weld seam. In this method, a linear weld seam is welded so that the focal spot of the laser beam and the weld seam generated have a fixed, known (central) position in the detection field of the camera on the workpiece, i.e. its image capture area on the workpiece. The linear course of the weld seam allows a simple evaluation of the camera image because only limited image areas at previously fixed, always identical points in the image have to be evaluated.

In practice, however, cuts or weld seams having freely programmable, e.g., curved shapes, are also generated in laser-machining processes. When cutting or welding any desired shape of path, the position of the cutting gap, the weld pool and the seam in the camera image cannot be predicted for image evaluation because it depends on the feed direction of the machining head. For this reason, in order to detect defects, the entire detection field of the photo detector must be evaluated in each case in order to be sure of detecting the position of the gap or the weld seam. Depending on the optical and temporal resolution (image refresh rate) of the detectors, this can be an extremely complex, computationally intensive and time-consuming process. This problem may be exacerbated further in the case of a combined movement of the machining head and scanner optics arranged therein with respect to the workpieces to be machined (which is not uncommon in practice, for example, in the case of remote laser welding).

DE 10 2008 062 866 A1 discloses a method for detecting defects in a weld seam produced using the above-mentioned laser scanner welding process. After the weld seam has been produced, heat radiation emitted by the workpiece is detected using a camera oriented coaxially to the laser beam as described above and defects in the weld seam are detected based on an evaluation of the detected heat radiation. With this method, it is not possible to intervene in a closed-loop control of the welding process if a defect is found in the weld seam. The laser-welding process also has to be interrupted whenever the weld seam is checked, which can be a disadvantage in terms of time and cost.

DE 10 2007 025 463 A1 discloses a laser scanner welding method in which a camera oriented coaxially to the laser beam is likewise arranged in the detection beam path of the scan head in order to monitor the welding process. The laser-machining of parts of workpieces is carried out in quick succession at several machining positions of the workpieces. To allow essentially real-time monitoring of the machining process at the individual machining points, the acquisition of images by the camera is in each case triggered by the control signal of the scanner. The individual images taken are then assigned to different machining sequences, respectively, so that an image sequence is produced for each machining point. These sequences can subsequently be evaluated separately.

DE 10 2007 024 510 B3 discloses a method for the real-time monitoring of a laser scanner machining process, in which a desired fracture line is made in a workpiece using a laser beam. On one side of the workpiece facing away from the laser beam, the respective machining area, i.e. the desired fracture points to be made in the workpiece along a predefined machining path, is imaged by a matrix camera that is located at a fixed position. To monitor the laser-machining process, only pixels of the CMOS detector of the matrix camera for which the impingement of measurement radiation is expected are read and evaluated. This means that the computational effort and time required to evaluate the detected radiation can be reduced. This method is relatively inflexible because the detector is spatially fixed and not coaxial to the laser beam. For example, the stationary measurement sensor cannot be used in robotics-based remote laser welding processes, such as when making passenger car bodies.

SUMMARY

The present disclosure relates to providing laser-machining devices and methods for fast, simple, and reliable detection of defects in arbitrarily shaped weld seams and/or arbitrarily shaped cutting gaps during a laser-machining process.

In general, in a first aspect, the subject matter of the present disclosure is embodied in methods for detecting defects during a machining process, in which the methods include (a) moving a laser beam emitted from a machining head along a predefined path, such as a welding path or cutting path, over workpieces to be machined to generate a weld seam or a cutting gap, (b) detecting, over a two-dimensionally spatially resolved manner, radiation emitted and/or reflected by the workpiece by means of a detector which is arranged in or on the machining head, (c) selecting at least one detection field section in the detection field of the detector based on control data for controlling a movement of the laser beam along the cutting or welding path or based on a previously determined actual-position data of the laser beam along the welding or cutting path, (d) evaluating the radiation in the selected detection field section, and (e) detecting defects at the cutting edge or the weld seam based on the radiation evaluated in the selected detection field section.

In general, in another aspect, the subject matter of the present disclosure is embodied in a machining device that includes a machining head by which a laser beam can be moved along a predefined welding or cutting path over workpieces to be processed, a control unit for controlling the movement of the laser beam along the predefined welding or cutting path, a detector for detecting, in a two-dimensionally spatially resolved manner, radiation emitted by the workpiece within a detection field, and an evaluation unit for evaluating the radiation detected in the detection field. The control unit is programmed to transmit control data for controlling the movement of the laser beam along the welding or cutting path, i.e., target position data of the laser beam and/or previously determined actual-position data of the laser beam along the welding or cutting path to the evaluation unit. The evaluation unit is programmed to select at least one detection field section in the detection field of the detector based on the control data, evaluate the radiation in the selected detection field section, and detect defects at the cutting edge or the weld seam based on the radiation evaluated in the selected detection field section.

Implementations of the methods and/or devices can include one or more of the following features and advantages. For example, in some implementations, radiation emitted by the workpiece and/or radiation that is directed at the workpiece by an illumination device and reflected thereon is detected using a detector. The detector can be arranged in or on the machining head of the machining device. At least one detection field section in the detection field of the detector can be selected for evaluation on the basis of control data for controlling the movement of the laser beam along the machining path, that is to say on the basis of -target position data of the laser beam, or on the basis of previously determined actual-position data of the laser beam along the welding or cutting path, without previously evaluating the detector data. The detector measurements are then evaluated only in this detection field section. The desired-position data and the actual-position data indicate the predefined path along which the laser beam is moved over the workpieces to be machined. The course of the path curve can therefore be used as prior knowledge for assessing the detector data.

The target-position data of the laser beam can be determined based on the control data for the pivoting movement of at least one deflector means arranged in a scanner machining head (e.g., a scanner mirror) about deflector means pivot axis. In the case of a machining head without scanner optics, the target-position data of the laser beam can be derived from the control data for controlling a movement of the machining head relative to the workpieces. In the case of movement of both the machining head and the scanner optics, the target-position data of the laser beam can be derived from a combination of the control data of the scanner optics and the machining head.

Actual position data of the deflector means, arranged in the machining head, for deflecting the beam about the means' pivot axes (e.g., the means' respective pivoting angles) or speed measurements/vectors relating to a pivoting movement of the deflector means about the deflector means' pivot axes can be used to determine the actual-position data of the laser beam during machining Alternatively or in addition, the position coordinates and/or speed vectors of the machining head along or about the machining head's axes of movement can be included.

Based on the foregoing information, the detection field sections selected for evaluation can reliably be defined in the detection field despite the constantly changing position and orientation of the weld seam or of the cutting gap within the detection field. The detection field section can in this way be synchronized with the focal spot of the laser beam moving ahead of it. As a result, the weld seam or the cutting gap can be checked for defects as it is being created at always identical path sections relative to the focal spot of the laser beam moved over the workpieces.

The radiation detected in a two-dimensionally spatially resolved manner over the entire detection field of the detector is evaluated in the area of the defined detection field section or of the defined detection field sections. To do this, the corresponding measurement signals of those image points (pixels) of the detector, e.g. of a CCD or CMOS detector, that correspond to the respectively defined detection field section (detection field subsection) in the detection field are evaluated. The detection field section represents a small subsection of the detection field compared to the entire detection field of the detector. As a result, the total quantity of data to be evaluated in each case is minimized, which offers time-saving advantages. In some implementations, image data is only recorded for a detection field section translated based on a previously known path curve.

The control data for the movement of the laser beam, i.e., the target-position data of the laser beam, and/or the actual-position data of the laser beam can be transmitted during the machining process, before the beginning of the machining process, or in real time during the process from a control unit of the machining head to an evaluation unit for evaluation of the radiation detected in a two-dimensionally spatially resolved manner by the detector. Therefore, the laser-machining process does not have to be interrupted for the detection of radiation emitted by the workpieces or for evaluating the detected radiation in the respectively selected detection field section. This enables the detection of defects during the machining process in real time, which offers manufacturing advantages.

The control data or actual-position data are preferably transferred from the control unit of the laser-machining device to the evaluation unit via a data line. The control data can be temporarily saved here in an evaluation unit memory or stored permanently, for example for repetitive identical welding processes. Alternatively, the evaluation unit may also be part of the control unit of the laser-machining device so that the path information is transferred to the evaluation unit using software.

The thermal image of a weld seam, i.e., the solidified melt directly adjoining the liquid weld pool, can indicate the connection between the workpieces welded to one another (e.g., metal sheets). If there is a complete material connection between the workpieces, cooling takes place comparatively quickly owing to the conduction of heat into both workpieces. If there is a fusion defect in the weld seam, i.e., if the weld seam has one or more areas where there is not a complete material connection between the workpieces, the flow of heat into the workpieces is disrupted. The weld seam therefore remains hot for longer if such a fusion defect occurs. By evaluating the detected (heat) radiation in the area of the detection field section of the detection field of the detector, a local or temporal dissipation of heat into the workpieces can be determined and, as a result, fusion defects in the weld seam can be detected because the heat gradient of the cooling weld seam clearly changes.

Since the laser beam is normally moved during welding at a constant speed over the workpieces to be welded to one another, an essentially stationary temperature field can be formed around a laser-machining surface on the workpiece. The temporal path of the dissipation of heat into the workpiece or workpieces can therefore be determined through a spatially resolved measurement. Very reliable measurement values can be acquired using a two dimensionally spatially resolved measurement.

In some implementations, at least one detection field section includes a profile section, i.e., an elongated rectangular (linear) detection field section along or across a solidified melt which adjoins a liquid weld pool. In this implementation, at least one characteristic value for the dissipation of heat in the solidified melt can be determined by evaluating the radiation detected in a two-dimensionally spatially resolved manner along the profile section of the solidified melt. An experimentally determined reference value for the dissipation of heat in the solidified melt also can be predefined. Any defect in the weld seam is then detected by comparing the at least one characteristic value with the at least one predefined reference value.

In some implementations, the radiation is detected along at least two detection field sections, i.e. elongated rectangular (linear) detection field sections that are spaced apart from one another, that extend perpendicularly or approximately perpendicularly to the weld seam and are formed as profile sections is are evaluated. One of the two profile sections is preferably selected directly behind the weld pool and at least a second is selected at a defined distance further from the melt. The distribution of thermal radiation perpendicularly to the weld seam is evaluated at each of the two profile sections so that the hottest part of the weld seam, i.e., the maximum intensity of the detected radiation, can be determined. This detection of the hottest part significantly increases the reliability of the measurement compared to the detection of individual points along the path of the weld seam. For the purposes of evaluation, a quotient can be calculated from the maximum intensities of the radiation of the profile sections. A fusion defect exists if the quotient exceeds a predefined reference value or the reciprocal of the quotient is below a predefined reference value. The predefined reference value is application-specific and can be determined experimentally beforehand in each case. Alternatively or in addition, using an analogous approach, fusion defects can be detected based on the respective profile full-width at half maximum.

In some implementations, the detected radiation is evaluated along a profile section, i.e. an elongated rectangular (linear) detection field section that extends essentially parallel to the weld path, preferably on the axis of symmetry of the weld seam. The intensity of the radiation along this profile section, which corresponds to the pixel brightness in the photograph taken, e.g., using a camera, has a path that is characteristic of the dissipation of heat into the component.

Accordingly, a characteristic value can be determined by comparing the (spatial) path of the radiation intensity along the profile section with a model path, preferably with an exponential function. The path of the radiation intensity along the profile section may be described using a mathematical model such as, for example, an exponential function $$I = B * \exp(C * X) - A,$$

where I is the radiation intensity, A is the proportion of background radiation (assumed to be homogenous) and X is the position along the profile section. The adjustment coefficients B and C are variables that represent the conveying of heat into the workpiece. When a fusion defect occurs, the coefficient B is higher and the coefficient C markedly lower.

The quality of the adjustment of the exponential function to the heat trace of the weld seam may be described using a suitable measure, e.g., using the sum of the error squares (what are referred to as chi-squared errors). In a successful adjustment, this characteristic value shows small numerical values for each detector image. If locally high chi-squared errors are determined in a weld seam path evaluation or in a sequence of detector images over time, this indicates local disruptions in the heat trace, e.g., a hole in the workpiece.

In some implementations, the at least one detection field section includes a liquid weld pool of the weld seam with a focal spot of the laser beam. When evaluating the radiation detected in the detection field section, an intensity distribution of the radiation in the detection field section is determined. A minimum intensity area of the liquid weld pool is located and a defect in the weld seam is detected based on the relative position of the minimum intensity area in the intensity distribution and/or based on the intensity of the located minimum intensity area.

In spatially resolved detection of the radiation emitted in the area of the melt of the liquid weld pool near the capillary during welding, a maximum intensity area of the radiation (which is caused by the laser focal spot) can be found at the lap joint. A small-area minimum intensity may exist within the focal spot of the laser beam, in which the small-area minimum intensity represents the capillary opening. A minimum intensity or maximum intensity area is understood to be an area having a radiation intensity below or respectively above the radiation intensity of the rest of the liquid weld pool. Further to the small-area minimum intensity existing within the laser focal spot, an additional, comparatively large-area minimum intensity area can be detected which, in relation to the machining direction, lies behind the maximum intensity area of the laser focal spot. It has been determined that weld defects can be inferred from the characteristics of this additional minimum intensity area.

For example, in order to detect a fusion defect in the weld seam, a distance between a rear edge of the focal spot of the laser and a front edge of the additional minimum intensity area can be compared with a predefined limit distance. It has been determined that a good material connection between the workpieces can be assumed if the surface of the minimum intensity area overlaps the focal spot of the laser. If the minimum intensity becomes separated from the focal spot of the laser, then this indicates a fusion defect in the weld seam.

The seam quality can be assessed, i.e., defects in the weld seam can be detected, by evaluating the distance of a leading front edge of the minimum intensity area or of a front edge interpolated from the form of the minimum intensity relative to the rear edge of the focal spot of the laser. In the case of an overlap, a material connection between the metal sheets can be assumed. If the distance exceeds a definable or defined limit distance, a fusion defect can be diagnosed. This defined limit distance can be determined by test weldings and may, in certain cases, also have a zero or negative value, as a result of which a fusion defect is detected as soon as the minimum intensity area becomes separated from the focal spot of the laser beam.

In some implementations, a fusion defect in the weld seam can be identified if the minimum intensity area of the detected radiation is not found. The minimum intensity behind the laser focal spot is indicative of a weld pool deficit due to a gap required between the metal sheets. This weld pool deficit arises if the initially separate melts of the upper and lower metal sheets combine behind the laser focal spot to form a joint weld pool. The gap is in this case bridged and a material connection is formed between the metal sheets. However, if the melts of the upper and lower metal sheets do not combine, the minimum intensity behind the focal spot of the laser beam disappears, indicating a fusion defect. In this case, the individual melts of the upper and lower metal sheets solidify separately and what is known as a "false friend" is produced.

In some implementations, the foregoing aspects can include one or more of the following features. Signals that are recorded during the welding process in the liquid melting bath provide a prediction of defects but cannot be used to detect changes in the weld seam resulting from changes in the solidifying melt on cooling. Additional information, e.g., on fusion defects, can be obtained by observing the area of the solidified melt immediately after welding. However, through a combined evaluation, a check can be carried out immediately as to whether a weld seam defect found during monitoring of the liquid melting bath near the capillary arises in the same place in the cooling weld seam. By ensuring the detection of weld seam defects through the combined evaluation of geometrical features based on the liquid melting bath near the capillary and thermographic data based on the solidified melt, a highly reliable process monitoring can be achieved.

In some implementations, after detecting a defect in the weld seam, an intervention is made in the laser scanner welding process by which a closed-loop control of welding process can be achieved. By doing so, one or more welding parameters, such as, for example, welding speed, radiation intensity, and/or clamping forces, can be modified in order to improve the quality of the welding.

To perform spatially resolved detection of radiation, a spatially resolving detector configured to detect visible radiation or radiation in the near, mid or far infrared range may be used. For example, a charge-coupled device (CCD), a complementary metal oxide semiconductor (CMOS) device, a diode array, an InGaAs thermal camera, a quotient pyrometry measurement apparatus or a combination of different types of detectors may be used. The quotient pyrometry measurement apparatus determines, in a spatially resolved manner, the temperature in the monitored area through the simultaneous measurement of radiation emitted at two different wavelengths. In order to detect fusion defects or penetration defects, it is possible, as described above, to use two detection field sections in the detection field of the detector: the area of the liquid melting bath near the capillary and the area of the solidified melt. When a detector is arranged in the detection beam path of the scan head (e.g., coaxially to the laser beam), the area of the liquid melting bath near the capillary and the area of the solidified melt of the weld seam can be monitored with just one camera.

The radiation emitted can be detected in a two-dimensionally spatially resolved manner in a wavelength range in the near infrared, e.g., between 1 µm and 2 µm. This range is particularly suitable for detecting the heat radiation of the solidified melt. Radiation in this wavelength range may also simultaneously be used to observe the liquid melt. Radiation in other wavelength ranges, e.g., in the visible range, can additionally or alternatively also be detected in a spatially resolved manner, such as for evaluating the geometry of the liquid weld pool.

The foregoing features and those set out below may be used individually or collectively in any desired combination. The embodiments shown and described are not to be understood as an exhaustive list, but are instead examples to describe the invention. Additional features and advantages of one or more implementations will be apparent from the description, the claims and the drawings.

DETAILED DESCRIPTION

Figure 1:
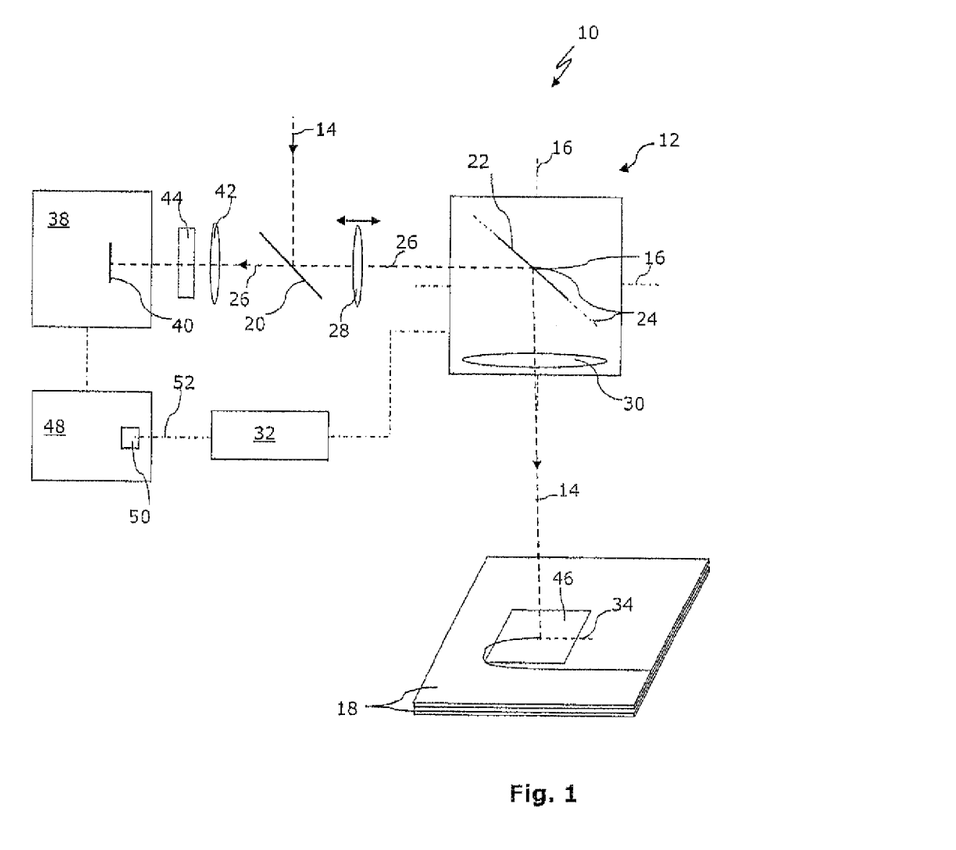
FIG. 1 is a block diagram of a laser scanner welding device in which a laser beam is moved by a scan head along a predefined weld path over workpieces to be welded to one another.

FIG. 1 is a block diagram of a laser scanner welding device 10 with a scan head 12 by which a laser beam 14 produced by a laser beam source is guided. The scan head 12 can be moved along or about axes of movement 16 arranged orthogonally to one another with respect to workpieces 18 to be welded to one another, in this instance galvanized metal sheets, and has a number of optical components for guiding and focusing the laser beam 14. A beam splitter 20 that is impervious to the laser beam 14 serves to redirect the laser beam in the direction of a gimballed deflector means 22, in this instance a scan mirror that can be pivoted with respect to the workpieces 18 about two pivot axes 24 arranged orthogonally to one another.

Arranged in the laser beam path 26, there is an adjustment lens 28 that can be displaced along the laser beam path and by which a laser beam focus position with respect to the workpieces 18 can be set. Focusing optics 30 are fitted downstream of the scan mirror.

In the present case, the laser beam 14 is directed at the workpieces 18. In order to weld the two workpieces 18, the laser beam 14 can be moved by the pivotably mounted scan mirror 22 or by an additionally overlaid (if applicable, robotics-based) movement of the scan head 12 along or about its axes of movement 16 over the workpieces.

A programmable control unit 32 serves to control (or regulate) the movement of the laser beam 14 along a predefined weld path 34, along which a weld seam 36 connecting the workpieces 18 is supposed to be generated. The control unit 32 also serves to control (or regulate) further laser beam parameters, such as, for example, the focus position and/or intensity.

For the optical monitoring of the laser welding process, in particular for detecting defects in the weld seam 36, a camera 38 is arranged in or on the scan head 12. The camera 38 has a detector 40 (e.g., a photodetector), in this instance a CMOS chip, which is arranged in a detection beam path 26' of the scan head 12. As shown in FIG. 1, the detection beam path 26' includes the scan mirror 22 and the beam splitter 20. In the present example, the detection beam path also includes the focusing lens 30, imaging optics 42 and an optical filter 44. The detection beam path 26' therefore coincides with the laser beam path 26 between the focusing lens 30 and the beam splitter 20.

The detector 40 serves to detect, in a two-dimensionally spatially resolved manner, radiation emitted by the workpiece in a wavelength range in the near infrared. In the present example, a rectangular detection field 46 of the detector 40 is moved along the weld path 34 with the laser beam 14 in a synchronized manner, as the laser beam 14 is moved with respect to the workpieces. In the exemplary embodiment shown here, the detector is oriented coaxially to the laser beam, but the detector may also be oriented non-coaxially to the laser beam.

An evaluation unit 48 connected to the detector 40 and having a memory 50 serves to read and evaluate the radiation detected in a two-dimensionally spatially resolved manner in the entire detection field 46 of the detector 40. The evaluation unit 48 is connected to the control unit 32 via a data line 52. The control unit 32 is programmed to transmit target-position data of the laser beam 14, e.g., control data that serve to control the movement of the laser beam 14 along the predefined weld path 34 relative to the workpieces 18, to the evaluation unit 48 using the data line 52 before or during a laser scanner welding process. Alternatively, using an additional sensor (not shown), the control unit 32 can also be programmed to detect respective position coordinates and/or speed vectors of the scan mirror 22 about its pivot axes 24 or of the scan head 12 about/along its axes of movement 16 when the laser beam 14 moves along the weld path 28. The control unit 32 may be further configured to transmit the obtained measurement data to the evaluation unit 48 through the data line 52 (e.g., in real time). The control and measurement data may be temporarily or permanently stored in the memory 50 of the evaluation unit 48.

During the laser welding process, the position of the cooling weld seam 36 in the detection field 46 of the detector 40 continually changes due to movement of the scan mirror 22 about its pivot axes 24 and/or due to relative movement of the scan head 12 with respect to the workpieces 18. However, evaluating the radiation detected by the detector 40 over the entire detection field 46 in order to check the weld seam for defects can be very complex and time-consuming.

For this reason, one or more(detection field sections (subsections of the detection field, e.g., profile sections of the weld seam) are defined in the two-dimensional detection field 46 of the detector 40 based on the control and measurement data stored in the memory 50 of the evaluation unit 48, e.g., based on the target or actual-position data of the laser beam 14 that describe the position of the weld path of the laser. The radiation from the workpieces 18 detected in a two-dimensionally spatially resolved manner is then selectively evaluated in the detection field sections defined by the weld path information in order to detect defects in the weld seam 36, e.g., at image points of the detector 40 spatially corresponding to detection field sections defined by the weld path information as a function of time.

Figure 2:
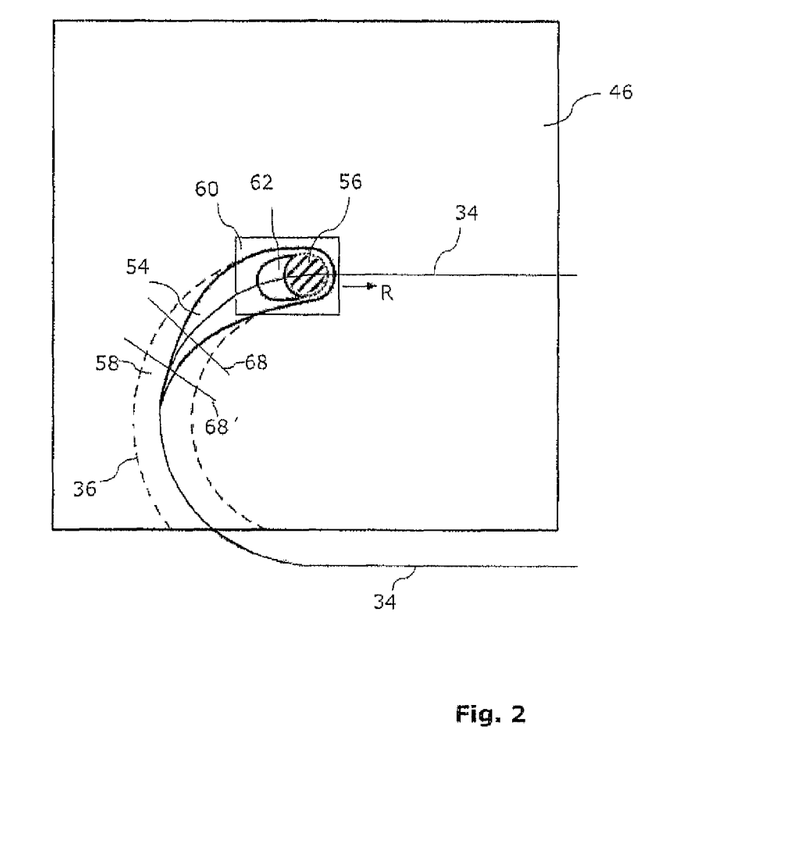
FIG. 2 is a schematic representation of a weld seam during a laser scanner welding process.

FIG. 2 shows a liquid weld pool 54 that, during the laser welding of the workpieces, is created along the predefined weld path 34 around a focal spot 56 of the laser beam where a vapor capillary is formed. The focal spot 56 of the laser beam is moved during the welding process at a constant speed over the workpieces to be welded to one another in weld direction R, which corresponds, in the present example, to a direction X of the XY coordinate system. A solidified melt 58, which forms the weld seam 36, adjoins the liquid weld pool 54 opposite to the weld direction R.

When laser welding the workpieces, fusion defects in the weld seam 36 may occur at the lap joint between the workpieces in which the weld seam 36 otherwise appears defect-free when viewed from the outside even though there is not a flush connection between the two workpieces as a result of the weld seam 36. To detect such a fusion defect or other defects in the weld seam, a first detection field section 60 is defined in the detection field 46, in which the section 60 contains a section of the liquid weld pool 54 with the focal spot 56 of the laser beam. The first detection field section 60 is defined based on the control or measurement data of the movement of the laser beam along the predefined weld path 34, as shown in FIG. 2.

The radiation intensity measured in the first detection field section 60 of the detection field 46 has a maximum intensity area within the focal spot 56 of the laser beam, i.e., the radiation intensity is higher within the focal spot 56 than in the surrounding liquid weld pool 54.

When welding at the lap joint, a minimum intensity area 62 adjoining the focal spot 56 of the laser beam usually forms behind the focal spot 56. The minimum intensity area 62 behind the focal spot 56 of the laser beam is an indication of a weld pool deficit due to a gap between the workpieces. This weld pool deficit occurs if the melts of the upper and lower workpieces combine behind the focal spot 56 of the laser beam to bridge the gap and form a material connection between the workpieces.

Figure 3A:
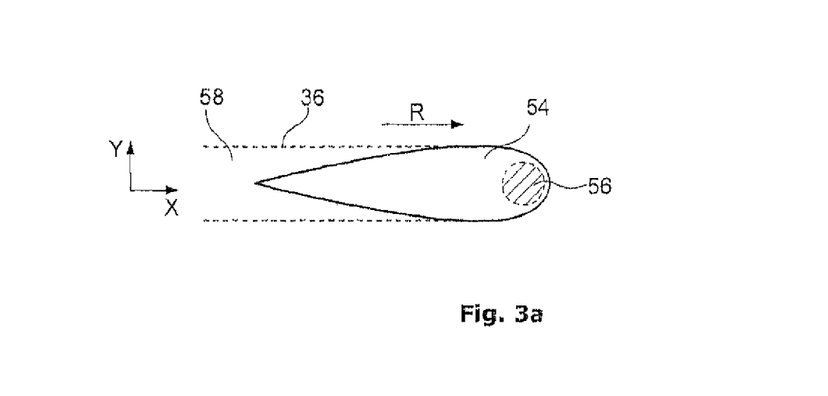
FIGS. 3a and 3b are schematic representations of a liquid weld pool of a weld seam without a minimum intensity area and a liquid weld pool of a weld seam with a minimum intensity area separated from a focal spot of a laser beam, respectively.

If the melts of the workpieces 18 do not combine, then only the focal spot 56 with the maximum radiation and, if applicable, the capillary opening may be visible during the welding process, whereas the minimum intensity area behind the focal spot disappears, as shown in FIG. 3a. If this occurs, it is assumed that there is a fusion defect in the weld seam 36.

Figure 3B:
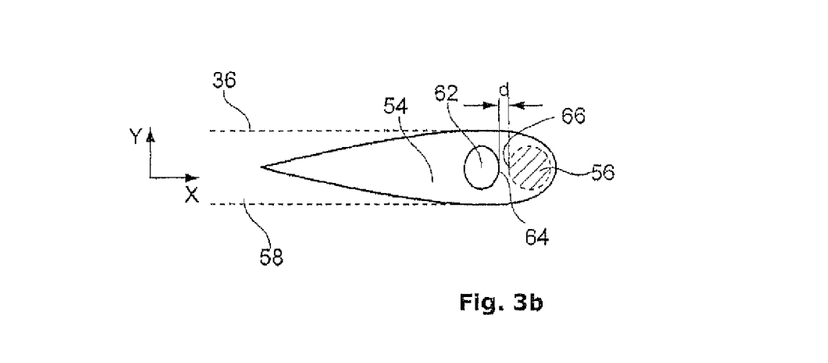

Conversely, a good material connection between the workpieces can be assumed if the minimum intensity area 62 overlaps the focal spot 56, as shown in FIG. 2. If, on the other hand, the minimum intensity area 56 separates spatially from the focal spot 56, as shown in FIG. 3b, this is also indicative of a fusion defect in the weld seam 36.

The quality of the weld seam 36 can be assessed by evaluating the distance d of a front edge 64 of the minimum intensity area 62, relative to the rear edge 66 of the focal spot 56. In the case of a distance d that is above a defined limit distance determined through test weldings, a fusion defect is diagnosed.

Figure 4:
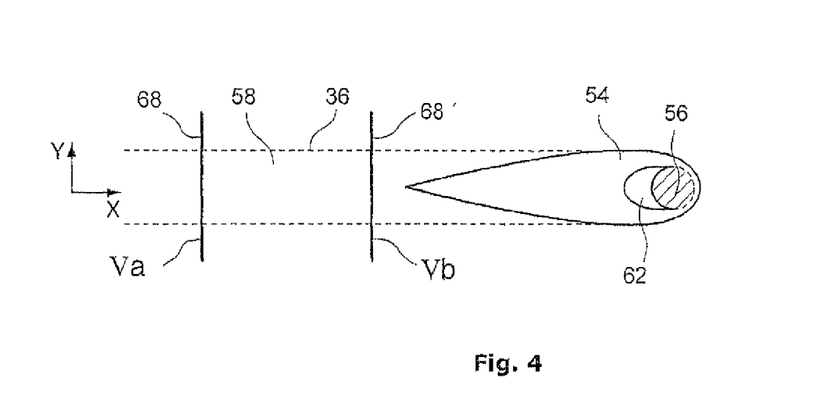
FIG. 4 is a schematic representation of a weld seam in which two detection field sections extend perpendicularly to the weld seam.

The measurement signals recorded in the liquid weld pool 54 during the welding process provide a prediction of defects and do not detect changes in the weld seam 36 resulting from changes in the melt 58 on cooling. Accordingly, in addition or as an alternative to the above-described evaluation of the radiation emitted by the weld pool 54, the radiation emitted by the solidified melt 58 and detected in a two-dimensionally spatially resolved manner in second detection field sections 68 and 68' (as shown in FIG. 2 and FIG. 4), can be evaluated to determine one or more characteristic values for the dissipation of heat in the solidified melt 58. By comparing the characteristic value with a predefined (preferably experimentally determined) reference value, defects then can be detected in the weld seam.

Two possible variations for measuring and evaluating the local or temporal dissipation of heat into the workpiece are explained below by way of example with respect to FIGS. 4 to 7. The representations in FIG. 4 and FIG. 6 show a linear weld seam course where the actually curved weld path is converted into a straight path on the basis of control or measurement data for the movement of the laser beam. The second detection field sections 68, 68' and 78 are, in both cases, weld seam test areas designed as profile sections, i.e., roughly one-dimensional lines in the two-dimensional radiation distribution of the radiation detected in the detection field.

By limiting the evaluation of the measured radiation to one or more profile sections at fixed positions based on the previously known path curve along the weld seam 36, laser processing of the weld seam 36 can be carried out significantly quicker compared to implementations in which an entire two-dimensional detection field of the weld seam is evaluated for defects; that is, the evaluation can be carried out with reduced computational effort and in real time.

With respect to a first measurement and evaluation technique, FIG. 4 shows the position of two detection field sections 68, 68' that are profile sections in the solidified melt 58 of the weld seam 36. The detection field sections 68, 68' extend, for example, at a distance of 4.5 mm from one another perpendicularly to the weld seam 36, in which the first detection field section 68 runs relatively far away from the weld pool 54 and the second detection field section 68' runs almost immediately behind the weld pool 54.

Figure 5A:
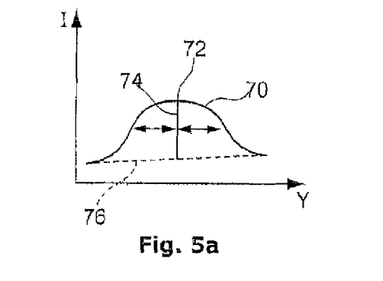
FIGS. 5a and 5b are schematic representations of radiation intensity distributions detected along the two detection field sections of FIG. 4.
Figure 5B:
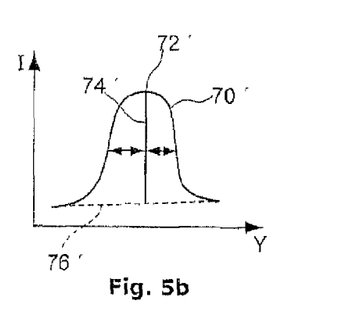
Figure 6:
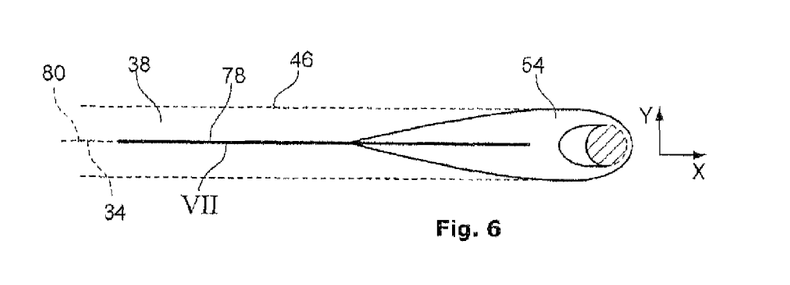
FIG. 6 is a schematic representation of the weld seam in which a detection field section extends along an axis of symmetry of the weld seam.

FIGS. 5a and 5b show the associated intensity distributions 70, 70' of the detected radiation along the two profile sections, respectively. The radiation intensity is in each case essentially a Gaussian distribution about a maximum 72, 72', in which the half-widths at half maximum of the distributions are represented by double arrows.

To determine a characteristic value for the dissipation of heat between the profile sections, a heat dissipation quotient can be obtained from the maximums 72, 72' of the intensity distributions. Alternatively, to determine the characteristic value, the heat dissipation quotient may be determined from respective profile heights 74, 74', i.e., the differences between the maximums 72, 72' and the intensity curves of the background radiation 76, 76'. The intensity curves of the background radiation 76, 76' are determined here by following the entire profile of each intensity distributions 70, 70' up to the edges of the Gaussian distribution and connecting the edges by a straight line. This ensures that the proportion of background radiation 76, 76' is disregarded when determining the characteristic value.

To determine a fusion defect, the heat dissipation quotient is compared with a reference value. In implementations where there is a complete connection between the workpieces, the dissipation of heat into the workpieces takes place relatively quickly. In contrast, a fusion defect between the workpieces causes a slower flow of heat into the workpieces, such that a defect can be assumed to exist if the calculated heat dissipation quotient exceeds the reference value or the reciprocal of the heat dissipation quotient is below the reference value. The reference value is application-specific and may be determined experimentally.

As an alternative or optionally additional feature, the full width at half maximum of the intensity distributions can be evaluated. In the present example, the full width at half maximum of the second intensity distribution 70 is much wider than the first intensity distribution 70' due to the lateral dissipation of heat into the component. The full width at half maximum is preferably evaluated as described above by calculating a heat dissipation quotient and can likewise be applied as a feature for assessing the presence of a defect in a weld seam.

Other conclusions about the weld seam produced can also be drawn from asymmetries arising out of the intensity curves 70, 70', which may indicate an asymmetric dissipation of heat into the components. Provided the workpieces are of equal thickness and are of the same material, a defective lateral seam positioning can be detected based on an asymmetric dissipation of heat when welding an I-seam at the butt joint. This may occur, for example, in metal sheet welding implementations, such as in tailored blank welding, profile welding and pipe longitudinal and transverse welding.

Figure 7:
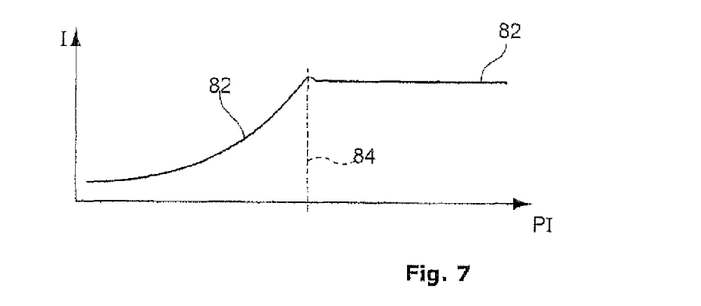
FIG. 7 is a schematic representation of radiation intensity distribution detected along the detection field section of FIG. 6.

In a second measurement and evaluation technique, illustrated in the example of FIG. 6, a third detection field section 78 in the detection field is evaluated based on the target or actual-position data of the laser beam 14 stored in the memory of the evaluation unit (FIG. 1). The third detection field section 78 is designed as an individual profile section (line) along an axis of symmetry 80 of the weld seam 32 coinciding with the predefined weld path 34. An intensity curve of the radiation 82, 82' detected along the profile section is shown in FIG. 7.

The intensity I along this profile section, which corresponds to the pixel brightness of an image recorded with the CMOS camera 38, has a characteristic curve that can be expressed using a mathematical model, for example an exponential function $$I=B*\exp(C*X)-A \qquad (1).$$

In the present example, the adjustment coefficients B and C are features representing the transmission of heat into the workpiece and A represents the proportion of background radiation. When a fusion defect occurs, coefficient B is higher and coefficient C is markedly lower. The quality of the adjustment of the exponential function in equation (1) to the intensity distribution of radiation 82, 82' (that is detected along the axis of symmetry 80 of the weld seam 36 in the solidified melt 58) is quantified using the sum of the error squares in the form of the chi-squared test. In implementations where the adjustment is successful, the chi-squared value is small for each camera image. If locally high chi-squared values are determined in a weld seam path or in the image sequence, this indicates local disruptions in the heat trace, e.g., a hole in the component.

If the first detection field section 60 (FIG. 2) and the second detection field sections 68, 68' (FIGS. 4 and 5) are evaluated as described above by a combined evaluation, a check may be carried out as to whether a weld seam defect found during monitoring of the liquid weld pool 54 near the capillary is detectable in the same position in the cooling weld seam 36. A high reliability of process monitoring may be achieved by ensuring the detection of weld defects through combined evaluation of geometrical features based on the liquid weld pool 54 near the capillary and thermographic data based on the solidified melt 58. To increase quality, the welding process can also be close-loop controlled on the basis of the measurements, e.g. by varying the beam power or the welding speed, or by interventions in the system technology, such as tracking of clamping forces.

For the two-dimensionally spatially resolved detection of emitted radiation, spatially resolving detectors (FIG. 1) for the visible or near (preferably between wavelengths of 1 µm and 2 µm) to far infrared range may be used. As an alternative to the CMOS camera shown, a CCD camera, a photo diode array, an InGaAs thermal camera, a quotient pyrometry measurement apparatus, or combinations thereof also may be used.

A number of embodiments of the invention have been described. Nevertheless, it will be understood that various modifications may be made without departing from the spirit and scope of the invention. Accordingly, other embodiments are within the scope of the following claims.

What is claimed is:

1. A method for detecting defects during a machining process, the method comprising:

translating a plurality of workpieces relative to a laser beam, translating the laser beam relative to the plurality of workpieces, or translating both the plurality of workpieces and the laser beam relative to one another, so that the laser beam is incident on the plurality of workpieces along a predefined non-linear path, wherein the laser beam generates a non-linear weld seam or a non-linear cutting gap in the workpieces;

detecting, by a detector having a detection field and in a two-dimensionally spatially resolved manner, radiation emitted and/or reflected by the plurality of workpieces as a result of the incident laser beam;

selecting at least one detection field section at changing positions within the detection field of the detector based on laser beam control data defining movement of the laser beam along the predefined path or based on position data of the laser beam along the predefined path, wherein each detection field section comprises a region encompassing less than the entire detection field;

evaluating the radiation detected in the selected detection field section; and determining whether a defect exists at the weld seam or the cutting gap based on the evaluated radiation.

2. A method according to claim 1, wherein selecting the at least one detection field section is based on the laser beam control data, the method further comprising determining the laser beam control data based on data that defines a pivoting movement of at least one deflector about one or more pivot axes of a machining head.

3. A method according to claim 1, wherein selecting the at least one detection field is based on the position data of the laser beam, the method further comprising determining the position data of the laser beam based on at least one parameter selected from the group of parameters consisting of position coordinates of a deflector arranged in a machining head, speed vectors of the deflector arranged in the machining head, position coordinates of the machining head, and speed vectors of the machining head along and/or around axes of movement of the machining head.

4. A method according to claim 1, further comprising:
transferring the laser beam control data or the position data of the laser beam from a control unit to an evaluation unit during machining of the plurality of workpieces or before machining of the plurality of workpieces; and defining, using the evaluation unit, the at least one detection field section in the detection field of the detector based on the laser beam control data or the position data of the laser beam.

5. A method according to claim 1, wherein the at least one detection field section comprises a profile of a solidified melt that adjoins a liquid weld pool of the weld seam and extends perpendicularly or approximately perpendicularly to the weld seam.

6. A method according to claim 1, comprising selecting two detection field sections,
wherein each selected detection field section comprises a different profile of a solidified melt that adjoins a liquid weld pool of the weld seam,
wherein the two detection field sections are spaced apart from one another and extend perpendicularly or approximately perpendicularly to the weld seam, and
wherein both of the detection field sections are arranged behind the weld pool, with one of the two detection field sections being nearer to the weld pool than the other.

7. A method according to claim 1, wherein the at least one detection field section comprises a profile of a solidified melt that adjoins a liquid weld pool of the weld seam and extends parallel or approximately parallel to a welding direction.

8. A method according to claim 1, wherein the at least one detection field section comprises a region encompassing a liquid weld pool that surrounds a laser beam focal spot,
wherein evaluating the radiation detected in the selected detection field section comprises:
obtaining an intensity distribution of the detected radiation over the selected detection field section; and
locating a position corresponding to a minimum intensity area of the liquid weld pool in the selected detection field section based on the intensity distribution,
wherein the method further comprises locating a defect in the weld seam based on the position of the minimum intensity area relative to a position of the laser beam focal spot or based on the intensity of the minimum intensity area.

9. A method according to claim 1, wherein the at least one detection field section comprises a region encompassing a liquid weld pool that surrounds a laser beam focal spot,
wherein evaluating the radiation detected in the selected detection field section comprises obtaining an intensity distribution of the detected radiation over the selected detection field section, and
wherein the method further comprises detecting a fusion defect in the weld seam based on the absence of a minimum intensity area behind the laser beam focal spot.

10. A method according to claim 1, wherein selecting the at least one detection field section is based on the laser beam control data, the method further comprising determining the laser beam control data from data that defines a relative movement between the machining head and the workpieces.

11. A laser-machining device comprising:
a machining head configured to provide a laser beam;
a control unit for controlling the movement of the laser beam along a predefined welding or cutting path over a plurality of workpieces to be processed;
a detector having a detection field for detecting, in a two-dimensional spatially resolved manner, radiation emitted by at least one of the workpieces; and
an evaluation unit for evaluating the radiation detected in the detection field,
wherein the control unit is configured to transmit to the evaluation unit control data for controlling the movement of the laser beam along the welding or cutting path, wherein the control data comprises position data of the laser beam relating to a previously determined actual position of the laser beam or a future position of the laser beam along the welding or cutting path, and
wherein the evaluation unit is configured to:
select at least one detection field section in the detection field based on the control data, wherein each detection field section comprises a region encompassing less than the entire detection field;
evaluate the radiation detected in in the selected detection field section; and
determine whether a defect exists at the weld seam or the cutting gap based on the evaluated radiation.

12. A laser-machining device according to claim 11, wherein the machining head comprises at least one pivotably arranged deflector for directing the laser beam along the predefined welding or cutting path, and
wherein the detector is arranged in a detection beam path of the machining head.

13. A laser-machining device according to claim 12, wherein the control unit is configured to determine the future position the laser beam based on control data for controlling a pivoting movement of the at least one pivotably arranged deflector about the deflector's pivot axes or control data for controlling a relative movement of the machining head and the workpieces with respect to each other.

14. A laser-machining device according to claim 12, wherein the control unit is configured to determine the actual-position of the laser beam based on at least one parameter selected from the group of parameters consisting of position coordinates of the at least one deflector, speed vectors of the at least one deflector, position coordinates of the machining head along or about the machining head's axes of movement, and speed vectors of the machining head along or about the machining head's axes of movement.

\* \* \* \* \*

UNITED STATES PATENT AND TRADEMARK OFFICE
CERTIFICATE OF CORRECTION

PATENT NO. : 9,501,821 B2  
APPLICATION NO. : 14/140711  
DATED : November 22, 2016  
INVENTOR(S) : Dieter Pfitzner, Holger Braun and Friedhelm Dorsch Page 1 of 1

It is certified that error appears in the above-identified patent and that said Letters Patent is hereby corrected as shown below:

In the Claims

In Column 13, Line 51, in Claim 5, after "wherein" insert --the laser beam generates a non-linear weld seam, and--.

In Column 13, Line 58, in Claim 6, after "wherein" insert --the laser beam generates a non-linear weld seam,--.

In Column 13, Line 61, in Claim 6, delete "wherein".

In Column 13, Line 64, in Claim 6, delete "wherein".

In Column 14, Line 1, in Claim 7, after "wherein" insert --the laser beam generates a non-linear weld seam, and--.

In Column 14, Line 5, in Claim 8, after "wherein" insert --the laser beam generates a non-linear weld seam, and--.

In Column 14, Line 20, in Claim 9, after "wherein" insert --the laser beam generates a non-linear weld seam,--.

In Column 14, Line 23, in Claim 9, delete "wherein".

In Column 14, Line 27, in Claim 9, delete "wherein".

Signed and Sealed this  
Twenty-eighth Day of March, 2017

Michelle K. Lee  
*Director of the United States Patent and Trademark Office*